(12) United States Patent
Kobayashi

(10) Patent No.: US 11,785,377 B2
(45) Date of Patent: Oct. 10, 2023

(54) DISPLAY APPARATUS AND ACOUSTIC APPARATUS

(71) Applicant: Socionext Inc., Kanagawa (JP)

(72) Inventor: Katsumi Kobayashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 17/825,728

(22) Filed: May 26, 2022

(65) Prior Publication Data

US 2022/0286771 A1 Sep. 8, 2022

Related U.S. Application Data

(63) Continuation of application No. PCT/JP2019/047520, filed on Dec. 4, 2019.

(51) Int. Cl.
| | | |
|---|---|---|
| *H04R 1/34* | (2006.01) | |
| *G02B 27/01* | (2006.01) | |
| *H04R 1/02* | (2006.01) | |
| *B60K 35/00* | (2006.01) | |

(52) U.S. Cl.
CPC ......... *H04R 1/345* (2013.01); *G02B 27/0149* (2013.01); *H04R 1/025* (2013.01); *B60K 35/00* (2013.01); *B60K 2370/157* (2019.05); *B60K 2370/1529* (2019.05); *H04R 2499/13* (2013.01); *H04R 2499/15* (2013.01)

(58) Field of Classification Search
CPC .... H04R 1/345; H04R 1/025; H04R 2499/13; H04R 2499/15; H04R 1/2857; H04R 1/028; G02B 27/0149; B60K 35/00; B60K 2370/1529; B60K 2370/157
See application file for complete search history.

(56) References Cited

U.S. PATENT DOCUMENTS

| | | | |
|---|---|---|---|
| 2,789,651 A | | 4/1957 | Daniels |
| 5,394,478 A | * | 2/1995 | Hathaway ............ H04R 1/2842 |
| | | | 381/345 |
| 5,479,520 A | | 12/1995 | Nieuwendijk et al. |
| 6,335,974 B1 | | 1/2002 | Kunimoto |
| 6,801,633 B2 | * | 10/2004 | Tracy .................... H04R 1/345 |
| | | | 381/86 |

(Continued)

FOREIGN PATENT DOCUMENTS

| | | | |
|---|---|---|---|
| JP | H06-205491 A | | 7/1994 |
| JP | H10-262293 A | | 9/1998 |

(Continued)

OTHER PUBLICATIONS

International Search Report (ISR) dated Feb. 10, 2020 issued in International Patent Application No. PCT/JP2019/047520, with English translation.

(Continued)

*Primary Examiner* — Oyesola C Ojo
(74) *Attorney, Agent, or Firm* — McDermott Will & Emery LLP

(57) ABSTRACT

A display apparatus includes a display, and an acoustic unit connected to a sound source to transmit sound, wherein the acoustic unit includes a first cavity extending from the sound source in a first direction in which the sound is emitted, and a second cavity extending in a second direction that is different from the first direction, the second cavity being connected with the first cavity.

10 Claims, 17 Drawing Sheets

(56) References Cited

U.S. PATENT DOCUMENTS

| | | | |
|---|---|---|---|
| 9,154,869 B2* | 10/2015 | Cohen | H04R 1/2842 |
| 2014/0247959 A1* | 9/2014 | Yamanaka | H04R 1/345 |
| | | | 381/388 |
| 2016/0025973 A1 | 1/2016 | Guttag et al. | |
| 2018/0167724 A1 | 6/2018 | Jung et al. | |
| 2018/0222385 A1* | 8/2018 | Majkowski | G02B 27/0149 |
| 2019/0387299 A1* | 12/2019 | Evans | G06F 3/04815 |
| 2020/0162810 A1* | 5/2020 | Jung | H04R 1/345 |
| 2020/0196046 A1* | 6/2020 | Park | H04M 1/035 |
| 2021/0144458 A1* | 5/2021 | Zhang | H04M 1/035 |

FOREIGN PATENT DOCUMENTS

| | | |
|---|---|---|
| JP | 3186157 U | 9/2013 |
| JP | 2014-069692 A | 4/2014 |
| JP | 2016-224461 A | 12/2016 |
| JP | 2017-061220 A | 3/2017 |
| JP | 2017-531212 A | 10/2017 |
| JP | 2018-084767 A | 5/2018 |
| JP | 2019-023025 A | 2/2019 |
| JP | 2010-202100 A | 9/2019 |
| WO | 2015/151194 A1 | 10/2015 |
| WO | 2019/198213 A1 | 10/2019 |

OTHER PUBLICATIONS

Written Opinion of the International Searching Authority dated Feb. 10, 2020 issued in International Patent Application No. PCT/JP2019/047520, with English translation.

* cited by examiner

DISPLAY APPARATUS AND ACOUSTIC APPARATUS

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2019/047520 filed on Dec. 4, 2019 and designating the U.S., the entire contents of which are incorporated herein by reference.

FIELD

The present disclosure relates to a display apparatus and an acoustic apparatus.

BACKGROUND

A head-up display (HUD) that displays various kinds of information to a driver is known as a display apparatus for a vehicle.

SUMMARY

A display apparatus according to the present disclosure includes a display, and an acoustic unit connected to a sound source to transmit sound, wherein the acoustic unit includes a first cavity extending from the sound source in a first direction in which the sound is emitted, and a second cavity extending in a second direction that is different from the first direction, the second cavity being connected with the first cavity.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Figure 1:
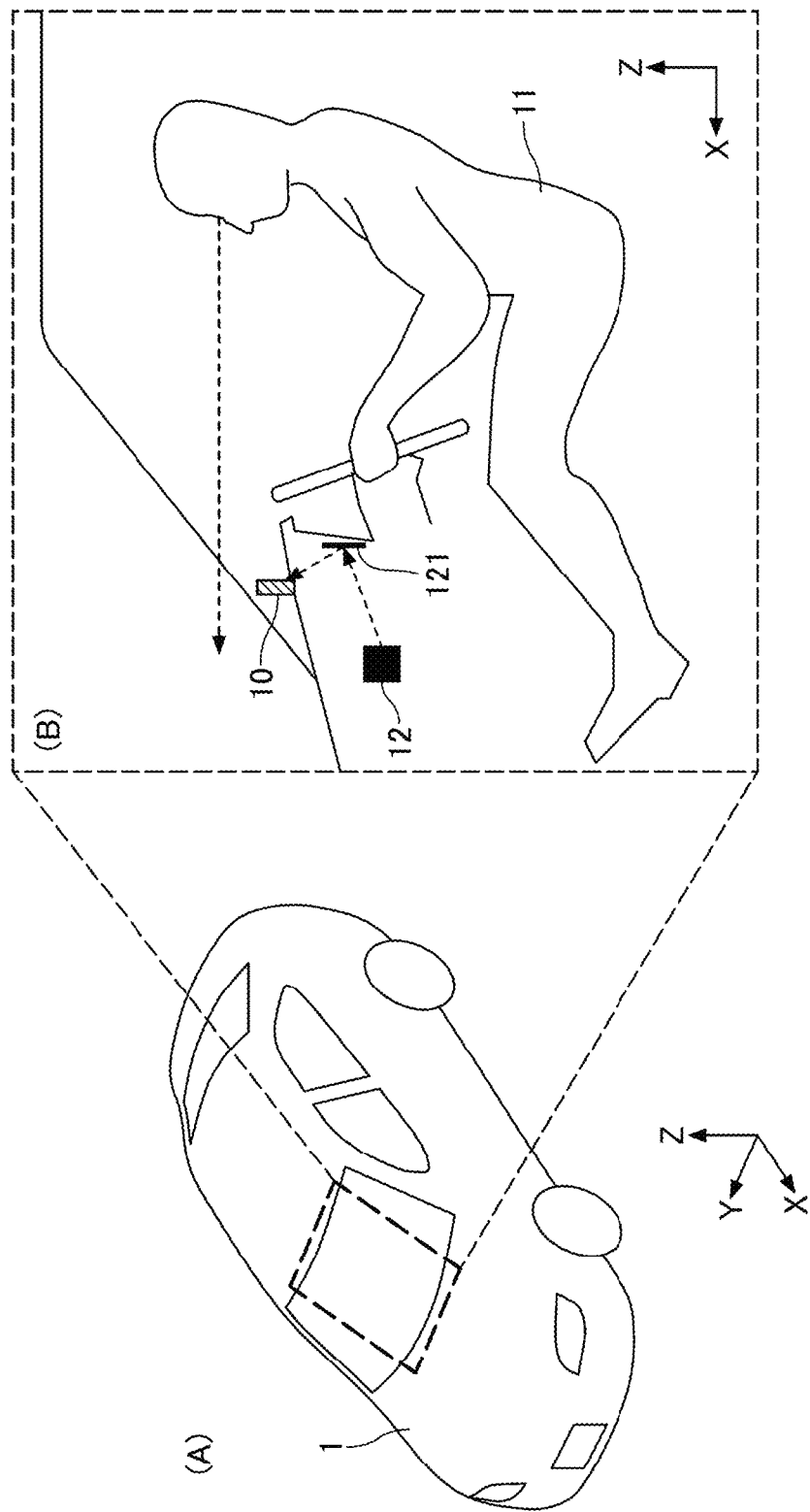
FIG. 1 is a drawing illustrating an example of use of a display apparatus.

A head-up display (HUD) that displays various kinds of information to a driver is known.

For example, HUDs are disclosed in the following documents:

International Publication No. 2015/151194;
Japanese Laid-Open Patent Publication No. 2018-84767;
Japanese Laid-Open Patent Publication No. 2016-224461;
Japanese Laid-Open Patent Publication No. 2017-61220;
Registered Utility Model Publication No. 3186157; and
Publication of Japanese Translation of PCT Application No. 2017-531212.

The inventor has discovered that, when an acoustic apparatus such as a speaker is added to be able to emit sound such as music or voice from a head-up display (HUD), i.e., an apparatus that displays information, the acoustic apparatus blocks forward visibility.

According to one aspect of the present disclosure, it is desired to provide an acoustic apparatus and a display apparatus that alleviate blocking of forward visibility.

Hereinafter, embodiments will be described with reference to the attached drawings. In the specification and drawings, components having substantially the same functional configurations are denoted with the same reference numerals, and duplicate description thereabout is omitted.

First Embodiment

<Example of HUD>

Hereinafter, a head-up display (HUD) is explained as an example of a display apparatus. The HUD is, for example, an onboard apparatus provided in a vehicle as follows.

FIG. 1 is a drawing illustrating an example of use of a display apparatus. In the following explanation, as illustrated in FIG. 1, as illustrated in the perspective view (A) of FIG. 1, a direction in which a vehicle 1 travels is referred to as an "X axis direction". Furthermore, the X axis direction is also a direction in which the driver of the vehicle 1 is seeing (i.e., front side with reference to the position of the driver). A direction orthogonal to the X axis direction (i.e., a right-hand side direction) is referred to as a "Y axis direction". Furthermore, a vertical direction (i.e., a gravity direction) to an X-Y plane is referred to as a "Z axis direction".

Furthermore, in the explanation explained below, the HUD 10 is installed such that the longitudinal direction of the HUD 10 coincides with the Y axis direction.

For example, the HUD 10 is installed and used as illustrated in the enlarged cross-sectional view (B) of FIG. 1.

The enlarged cross-sectional view (B) of FIG. 1 is a cross-sectional view taken along the X-Z plane in which an area, around the driver's seat of the vehicle 1 as illustrated in the perspective view (A) of FIG. 1, is enlarged. As illustrated in 1, for example, the HUD 10 is installed on a dashboard and the like. Furthermore, the HUD 10 is preferably installed at a position within the field of vision, e.g., on the dashboard, when the driver faces the front side, as illustrated in the enlarged cross-sectional view (B) of FIG. 1. When the HUD 10 is installed at such a position, the driver 11 can see information displayed on the HUD 10 without appreciably looking away from the front viewpoint.

Specifically, in the enlarged cross-sectional view (B) of FIG. 1, the driver 11 is looking at the front viewpoint. In this state, the HUD 10 is preferably installed at such a position that an image and the like displayed by the HUD 10 are within the field of view of the driver 11.

The HUD 10 displays, for example, information such as the speed of the vehicle 1, the amount of fuel remaining, or a route to the destination, for the driver 11.

The HUD 10 does not have to be within the field of view of the driver 11 at all times as illustrated in FIG. 1. For example, the HUD 10 may be configured to retract into the inside of the dashboard and pop up above the dashboard when displaying information. Specifically, a part of the entirety of the HUD 10 may be configured to be folded, rotated, or moved up and down. Furthermore, the HUD 10 may be provided on the dashboard at all times without a structure for retracting into the dashboard. Hereinafter, it is assumed that, for example, the HUD 10 is configured to be able to move up and down in the Z axis direction.

For example, the HUD 10 displays images and the like projected by the projection apparatus 12. Specifically, images are displayed by a projection system and the like including a display apparatus such as the HUD 10 and the projection apparatus 12. The HUD 10 is not limited to an apparatus for displaying images projected by the projection apparatus 12. For example, the HUD 10 may be an organic electro-luminescence (EL) display apparatus or the like. In addition, the projection system may include an optical component such as an optical reflection plate 121 or the like.

<Configuration Example of HUD>

Figure 2:
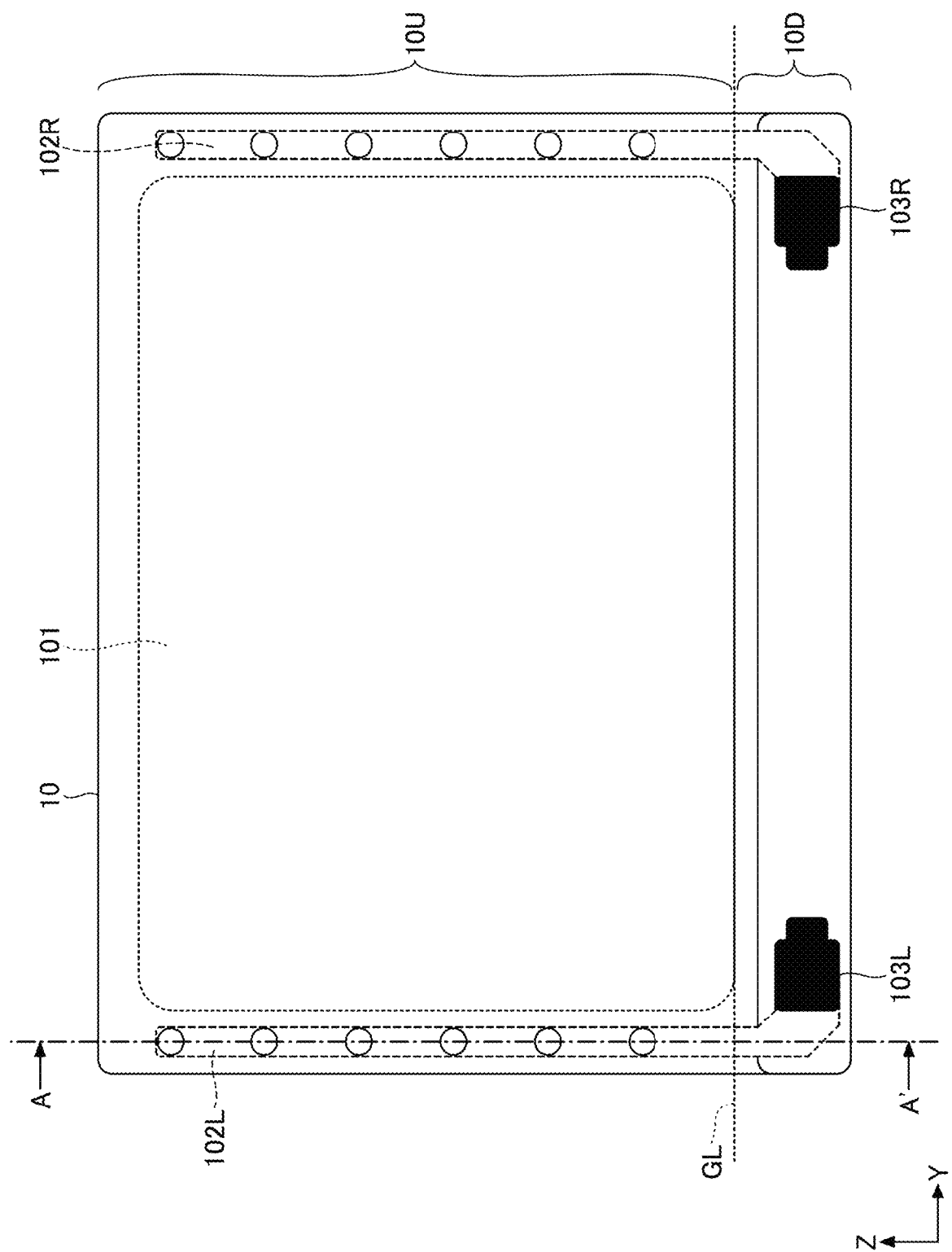
FIG. 2 is a drawing illustrating an example of configuration of a head-up display (HUD).

FIG. 2 is a drawing illustrating an example of configuration of an HUD. For example, the HUD 10 includes a display unit 101, a left-side acoustic unit 102L, and a right-side acoustic unit 102R.

The display unit 101 is an example of a display unit, and serves a portion on which an image is projected.

For example, the left-side acoustic unit 102L and the right-side acoustic unit 102R are placed in a linearly symmetrical arrangement about the axis of symmetry that is the center line of the display unit 101.

Hereinafter, it is assumed that, for example, the internal structures of the left-side acoustic unit 102L and the right-side acoustic unit 102R are also symmetrical, and the left-side acoustic unit 102L is explained as an example. However, the HUD 10 is not limited to the symmetrical configuration in which acoustic units are placed in a symmetrical arrangement as in the left-side acoustic unit 102L and the right-side acoustic unit 102R. For example, the left-side acoustic unit 102L and the right-side acoustic unit 102R may be different in the internal configuration, or may be placed in a non-symmetrical arrangement. Alternatively, only one of the left-side acoustic unit 102L and the right-side acoustic unit 102R be provided.

In this example, the HUD 10 includes an upper portion 10U and a lower portion 10D. Hereinafter, a border line that is between the upper portion 10U and the lower portion 10D and that is also a border line between the inside and the outside of the dashboard is referred to as a "border line GL". The border line GL does not necessarily have to be situated at the position as illustrated in FIG. 2.

The upper portion 10U is a portion situated on the upper side in the Z axis direction with respect to the dashboard, and mainly includes a display unit 101, the left-side acoustic unit 102L, and the right-side acoustic unit 102R.

The lower portion 10D is a portion situated in the inside of the dashboard. For example, the lower portion 10D includes a left-side speaker 103L, a right-side speaker 103R, and the like, which are an example of a sound source. The left-side speaker 103L and the right-side speaker 103R are connected to the left-side acoustic unit 102L and the right-side acoustic unit 102R, respectively, and are apparatuses for transmitting sound. The left-side speaker 103L and the right-side speaker 103R are connected to, for example, a playback apparatus and the like via wires or in a wireless manner. The left-side speaker 103L and the right-side speaker 103R emit sound on the basis of sound source data, a medium, or the like that are input to the playback apparatus and the like.

The lower portion 10D is not limited to the configuration as illustrated in FIG. 2. In addition, other apparatuses and the like may be provided in the lower portion 10D.

For example, the HUD 10 is configured such that the upper portion 10U can retract into the inside of the dashboard.

<Example of Structure of Acoustic Unit>

Hereinafter, an example of structure of an acoustic unit is explained with reference to a cross section of the left-side acoustic unit 102L taken along A-A' of FIG. 2.

Figure 3:
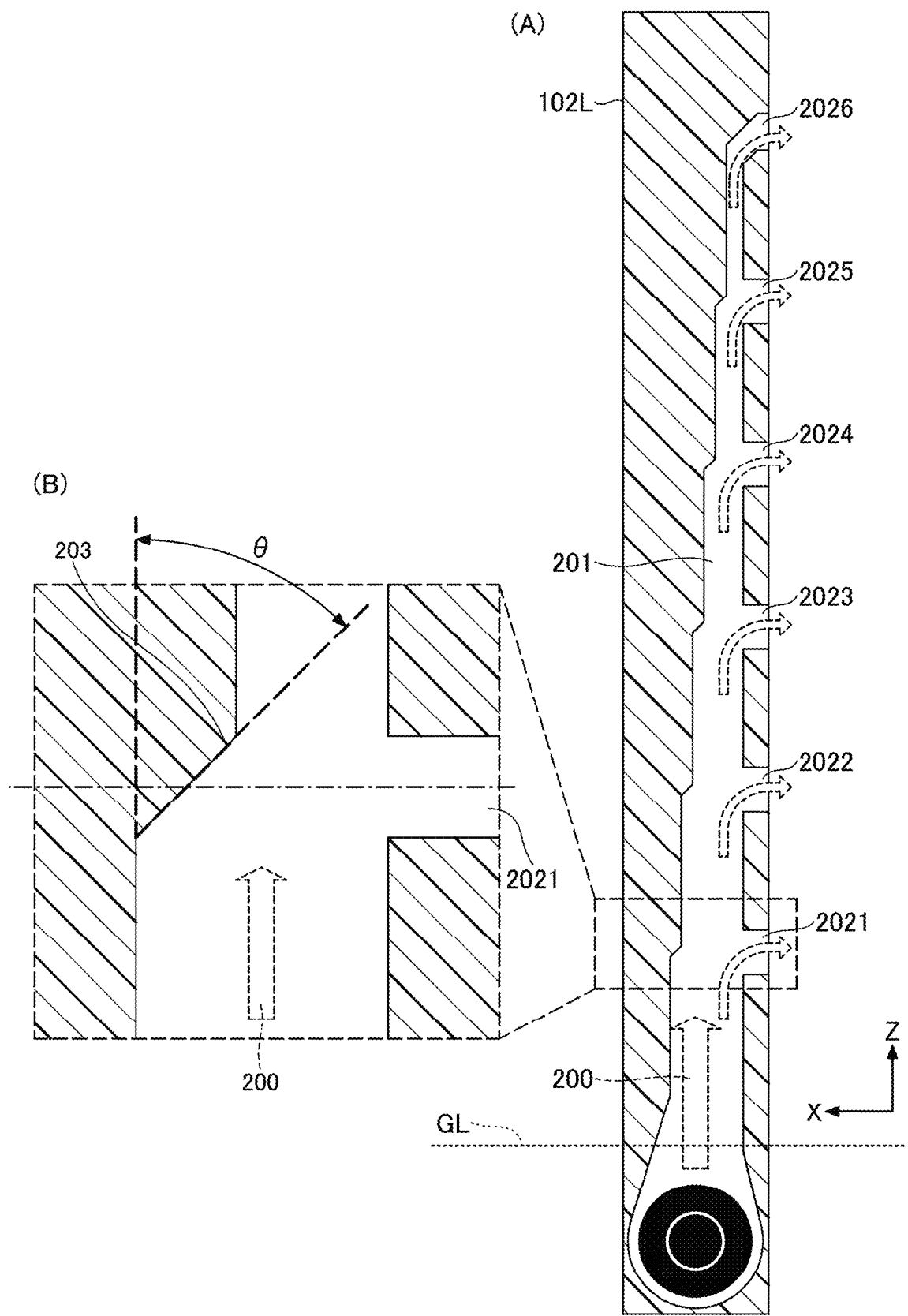
FIG. 3 is a drawing illustrating an example of configuration of an acoustic unit.

FIG. 3 is a drawing illustrating an example of configuration of the left-side acoustic unit 102L. The right-side acoustic unit 102R of FIG. 2 is not explained, because it has a structure symmetrical to, for example the left-side acoustic unit 102L.

In the following explanation, sound emitted from the left-side speaker 103L is transmitted to a first cavity unit 201 of the left-side acoustic unit 102L provided in the Z axis direction. Hereinafter, a direction in which sound is transmitted to the first cavity unit 201 is referred to as a "first direction" (indicated as a "sound emission direction 200" in FIG. 3). Therefore, the sound emission direction 200 that is an example of a first direction is adjusted by the direction of the sound source and a structure provided around the sound source (the direction of the first cavity unit 201 in this example) and is different according to the direction in which the sound emitted from the sound source is transmitted.

The left-side acoustic unit 102L includes, for example, a first cavity unit 201, a first through hole 2021, a second through hole 2022, a third through hole 2023, a fourth through hole 2024, a fifth through hole 2025, a sixth through hole 2026, and the like.

Specifically, in the example as illustrated in the cross-sectional view (A) of FIG. 3, the second cavity unit includes six through holes, i.e., a first through hole 2021 to a sixth through hole 2026.

First, the first cavity unit 201 is formed in the sound emission direction 200. Furthermore, through holes, e.g., a first through hole 2021, a second through hole 2022, a third through hole 2023, a fourth through hole 2024, a fifth through hole 2025, and a sixth through hole 2026, and the like, that are connected with the first cavity unit 201 are formed in a direction (hereinafter referred to as a "second direction") that is different from the sound emission direction 200 of the first cavity unit 201.

In this example, the through holes are open toward the minus side in the X axis direction (i.e., the right-hand side direction in FIG. 3). Specifically, in the example as illustrated in the enlarged cross-sectional view (B) of FIG. 1, the opening portions of the through holes are formed toward the driver 11. Furthermore, the first cavity unit 201 and the through hole are connected with each other, and accordingly, the sound transmitted via the first cavity unit 201 is output from the opening portions of the through holes to transmit the sound to the driver and the like.

In the first cavity unit 201, a reflection surface 203 is preferably formed with respect to the first direction.

The enlarged cross-sectional view (B) of FIG. 3 is an enlarged view illustrating an example where the reflection surface 203 is formed for the first through hole 2021. Hereinafter, an angle formed by the reflection surface 203 with respect to the first direction is referred to as an "angle θ".

The angle θ is, for example, 45 degrees.

With such an angle θ, sound can be efficiently emitted from the opening portion of the first through hole 2021 that is provided at substantially the same position as the reflection surface 203 in the sound emission direction 200. The reflection surface 203 may be in a shape with a rounded surface.

Therefore, the second cavity unit, e.g., the through holes and the like, is provided at a position where sound is desired to be output by the opening portion. Therefore, the second cavity unit may include additional through holes and the like that are different in number, position, and intervals from the through holes as illustrated in FIG. 3. When, as illustrated in FIG. 3, the second cavity unit is provided at a position in proximity to the display unit 101, for example, the driver feels as if the display unit 101 is outputting a sound that is in synchronization with the image on the display unit 101.

With the reflection surface 203 as illustrated in the enlarged cross-sectional view (B) of FIG. 3, a sound that returns in the direction of the sound source can be reduced. Accordingly, with the reflection surface 203 as illustrated in the enlarged cross-sectional view (B) of FIG. 3, the sound quality can be improved.

<Example of Second Cavity Unit>

The configuration of the second cavity unit, for example, the hole diameters of the through holes, the cavity length, the number of through holes, or a combination thereof, satisfies, for example, the condition shown in the following expression (1).

[Expression 1]

$$P_V \leq S_P \quad (1)$$

where, $P_V$ denotes a moved air volume, and $S_P$ denotes a total volume of a second cavity unit.

An "air volume moved by sound source" (which may be hereinafter simply referred to as "moved air volume $P_V$") in the left-hand side of the above-described expression (1) indicates a volume of air that is moved when the sound source outputs sound. For example, the unit of the moved air volume $P_V$ is "mm$^3$" (square millimeters). Specifically, the moved air volume $P_V$ is an amount as explained below.

Figure 4:
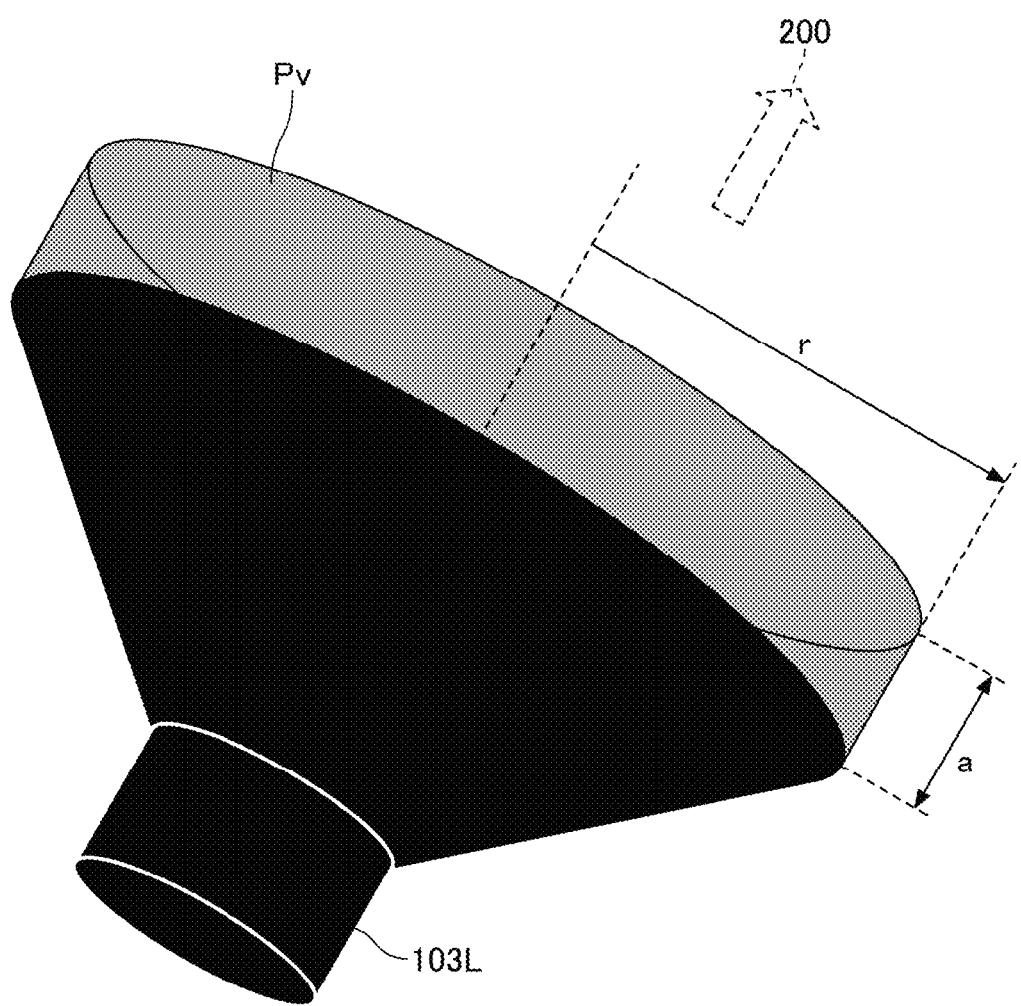
FIG. 4 is a drawing illustrating an example of a moved air volume.

FIG. 4 is a drawing illustrating an example of moved air volume $P_V$. Hereinafter, for example, the sound source is assumed to be the left-side speaker 103L. In this example, the moved air volume $P_V$ is calculated as shown in the following expression (1).

[Expression 2]

$$P_V = \pi \times r^2 \times a \quad (2)$$

where, $P_V$ denotes a moved air volume, r denotes a radius of sound source (vibration plate and the like), and a denotes a movement distance.

In the above-described expression (2), "r" denotes a radius of the left-side speaker 103L. In the above-described expression (2), "a" denotes a movement distance. For example, the movement distance is determined by the output of the sound source (the unit is W (watts)) and the like. In the above-described expression (2), the left-side speaker 103L is assumed to be in a circular shape. When the left-side speaker 103L is not in a circular shape, a term "π×r$^2$" is changed to the size of area of the portion of the left-side speaker 103L that moves air. Specifically, the term "π×r$^2$" in the above-described expression (2) is a calculation expression according to the shape and the like of the left-side speaker 103L, and the left-side speaker 103L may be in a shape other than the circular shape.

The total volume (which may be hereinafter simply referred to as "total volume $S_P$") of the second cavity unit in the right-hand side of the above-described expression (1) denotes the amount of air that can be output from the second cavity unit. For example, the unit of the total volume $S_P$ is "mm$^3$" (square millimeters). Specifically, the total volume $S_P$ is an amount as explained below.

Figure 5:
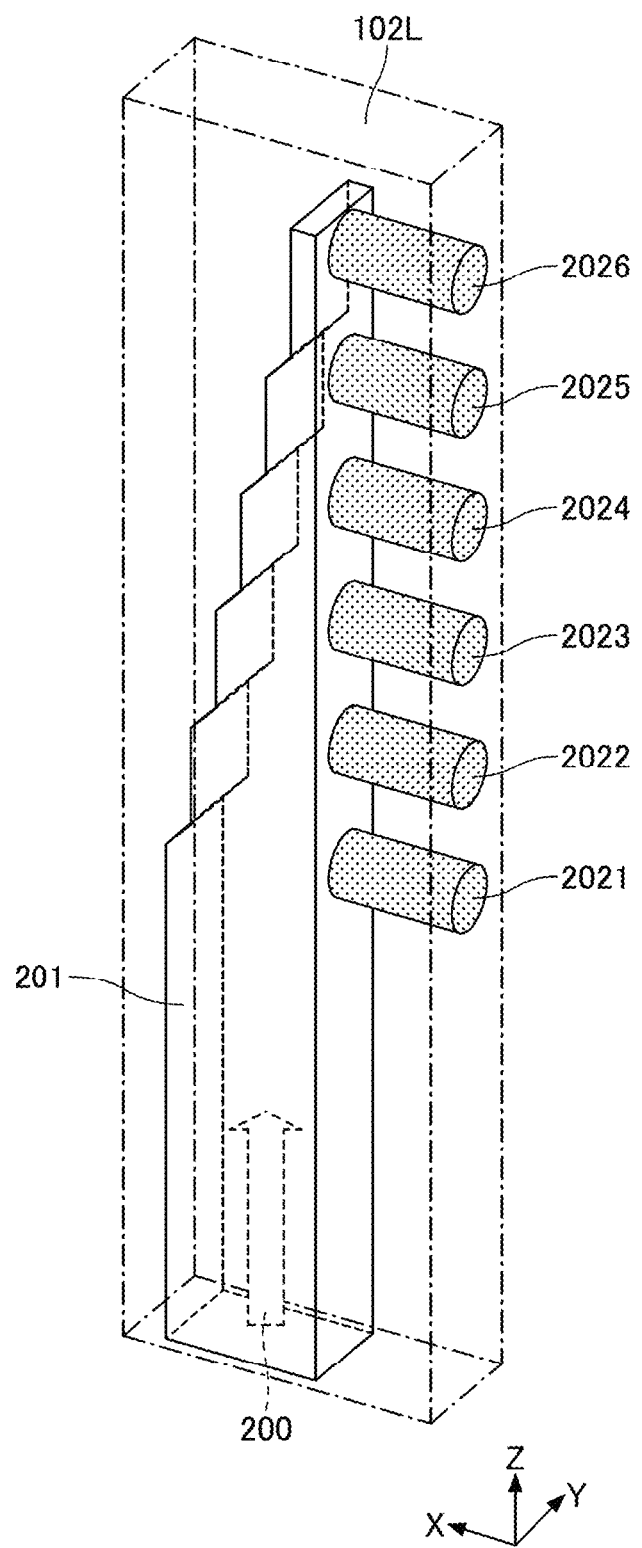
FIG. 5 is a drawing illustrating an example of a total volume.

FIG. 5 is a drawing (a perspective vie) illustrating an example of internal structure of the left-side speaker 103L to explain the total volume $S_P$. In this case, the total volume $S_P$ is explained with reference to the left-side acoustic unit 102L shown in the cross-sectional view (A) of FIG. 3, for example. In FIG. 5, outer portions (i.e., outer walls) are indicated by long dashed short dashed lines, and inner shapes (i.e., inner walls) are indicated by solid lines and broken lines.

In this example, as shown in the following expression (3), the total volume $S_P$ denotes the total summation of the volumes of the respective through holes. In FIG. 5, the spaces that are to be calculated as the total volume $S_P$ are meshed with dots.

[Expression 3]

$$S_P = \sum_{i=1}^{k} V_i \quad (3)$$

where, $S_P$ denotes the total volume of the second cavity unit, $V_i$ denotes a volume of each through hole or the like constituting the second cavity unit, k denotes the number of through holes and the like constituting the second cavity unit, and i denotes an identification number of each through hole or the like constituting the second cavity unit.

For example, in the left-side acoustic unit 102L as illustrated in FIG. 5, there are in total six through holes constituting the second cavity unit, and accordingly, the number "k" of through holes and the like constituting the second cavity unit in the above-described expression (3) is "6".

In this case, for example, it is assumed that the first through hole 2021, the second through hole 2022, the third through hole 2023, the fourth through hole 2024, the fifth through hole 2025, and the sixth through hole 2026 have the same radius and have the same cavity length. Specifically, in the following explanation, it is assumed that the volumes of the through holes are the same. Under such conditions, ail of the volumes "$V_i$" of the respective through holes in the above-described expression (3) are the same. Specifically, it is assumed that all of the volume "$V_1$" of the first through hole 2021, the volume "$V_2$" of the second through hole 2022, the volume "$V_3$" of the third through hole 2023, the volume "$V_4$" of the fourth through hole 2024, the volume "$V_5$" of the fifth through hole 2025, and the volume "$V_6$" of the sixth through hole 2026 are the same. However, the volumes "$V_i$" of the respective through holes may be different from one another. When the volumes "$V_i$" of the respective through holes are different from one another, the volume "$V_i$" of each through hole is calculated separately according to the shape and the like of the through hole, and the total volume $S_P$ in the above-described expression (3) is calculated by summing the calculation results.

Hereinafter, the volume "$V_1$" of the first through hole 2021, is explained. Other volumes are substantially the same, and therefore, explanation thereabout is omitted. For example, the volumes of the through holes are calculated as shown in the following expression (4).

[Expression 4]

$$V_1 \pi \times c^2 \times s \qquad (4)$$

where,
$V_1$ denotes the volume of the first through hole,
c denotes the radius of the first through hole, and
s denotes the cavity length the first through hole.

Figure 6:
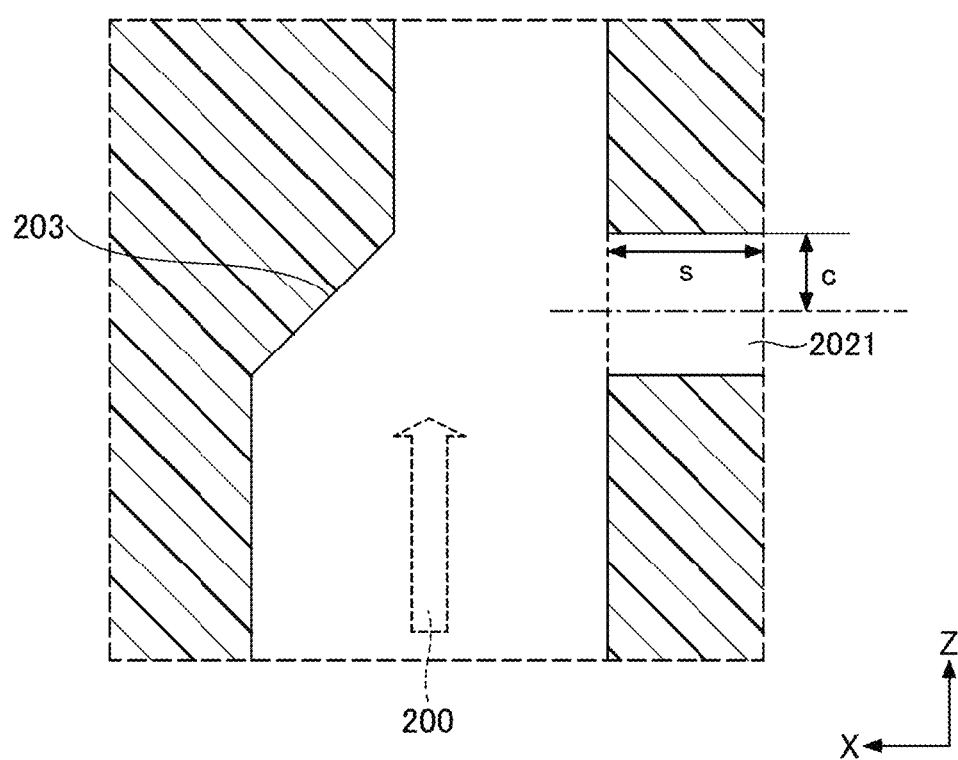
FIG. 6 is a drawing illustrating an example of calculation of a volume of a first through hole.

FIG. 6 is a drawing an illustrating example of calculation of the volume of the first through hole 2021. In the above-described expression (4), "c" denotes the radius of the first through hole 2021, and "s" denotes the cavity length the first through hole 2021. In the above-described expression (3) and the above-described expression (4), specifically, the expression for calculating the total volume $S_P$ is different according to the shape and the like of elements constituting the second cavity unit. Furthermore, the above-described expression (4) is an example, and may be changed as appropriate according to the shape of the first through hole 2021. Likewise, with respect to the second through hole 2022, the third through hole 2023, the fourth through hole 2024, the fifth through hole 2025, and the sixth through hole 2026, the above-described expression (4) may be changed as appropriate.

In this example, the conditions are such that the elements constituting the second cavity unit are the first through hole to the sixth through hole, and the volumes of all of these through holes are the same. In this example, the above-described expression (3) is calculated as shown in the following expression (5) on the basis of the above-described expression (4).

[Expression 5]

$$= \sum_{i=1}^{6} V_i = 6 \times V_1 \qquad (5)$$
$$= 6 \times (\pi \times c^2 \times s)$$

where the variables in the expression (5) are as explained with respect to the above expressions (3) and (4).

Therefore, when the values of the specific example illustrated in FIG. 5, i.e., the above-described expression (2) and the above-described expression (5) are substituted into the above-described expression (1), the condition as shown in the following expression (6) can be derived.

[Expression 6]

$$\pi \times r^2 \times a \leq 6 \times (\pi \times c^2 \times s) \qquad (6)$$

where the variables in the expression (6) are as explained with respect to the above expressions (1) to (5).

The second cavity unit satisfies, for example, the condition as shown in the above-described expression (6). Specifically, the second cavity unit has a space that is equal to or more than the moved air volume $P_V$ shown in the left-hand side of the above-described expression (6). Therefore, when the total volume $S_P$ indicated by the right-hand side of the above-described expression (6) is equal to or more than the moved air volume $P_V$, air that is moved in proximity to the sound source can be output.

As shown in this example, the second cavity unit may be calculated according to the radius (i.e., "c" in the above-described expression (6)), the cavity length (i.e., "s" in the above-described expression (6)), the number of cavities ("6" in the above-described expression (6)), or a combination thereof that satisfy the above-described condition.

Furthermore, as shown in the above-described expression (1), the total volume of the second cavity unit $S_P$ may be a volume equal to or more than the air volume $P_V$ moved by the sound source.

Air is a gas that can be compressed. Therefore, a compression rate of air (hereinafter, the compression rate is denoted with a variable "B") may be considered. Specifically, instead of the above-described expression (1), for example, the following expression (7) may be used.

[Expression 7]

$$B \times P_V \leq S_P \qquad (7)$$

where,
$P_V$ denotes an air volume moved by the sound source,
$S_P$ denotes a total volume of a second cavity unit, and
B denotes the compression rate of air.

In the above-described expression (7), the compression rate "B" of air is a value that is less than "1". Specifically, the compression rate "B" of air is a value indicating a ratio of the volume of compressed air to the volume of uncompressed air.

<Example of Production>

For example, the acoustic apparatus is manufactured as follows.

Figure 7:
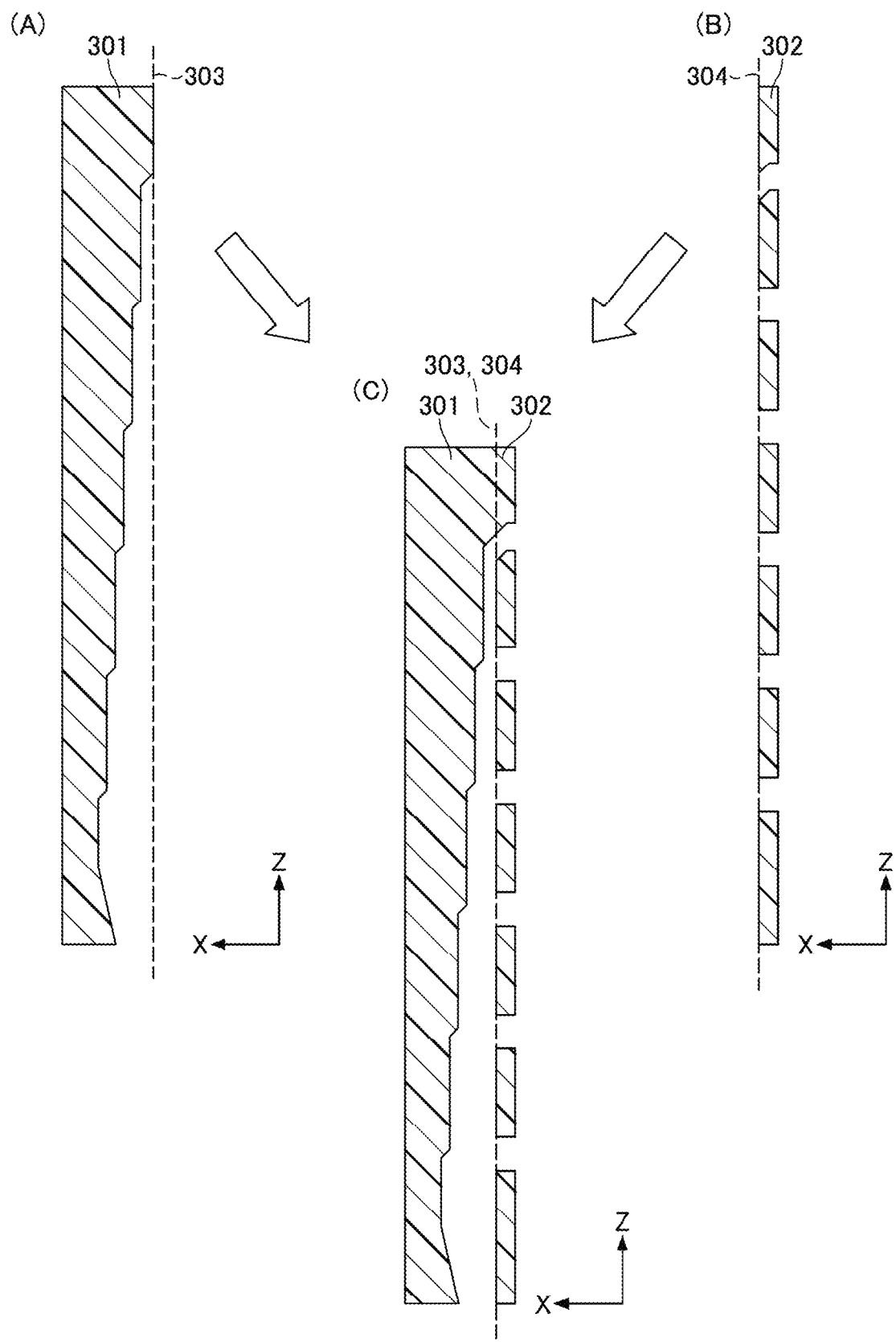
FIG. 7 is a drawing illustrating an example of production of an acoustic apparatus.

FIG. 7 is a drawing illustrating an example of production of an acoustic apparatus. Hereinafter, it is assumed that, for example, the acoustic apparatus having the structure as illustrated in the cross-sectional view (A) of FIG. 3 is produced. FIG. 7 shows a cross-sectional view corresponding to the cross-sectional view (A) of FIG. 3.

First, a portion as illustrated in the cross-sectional view (A) of FIG. 7 (hereinafter referred to as a "first portion 301") and a portion as illustrated in the cross-sectional view (B) of FIG. 7 (hereinafter referred to as a "second portion 302") are produced as separate components.

The first portion 301 and the second portion 302 are produced by pouring a material such as resin and the like into a mold, i.e., performing injection molding, casting, or the like.

Alternatively, the first portion 301 and the second portion 302 may be produced by machining or printing with a 3D printer and the like.

As described above, first, steps for forming the components are performed.

Subsequently, a step of bonding the first portion 301 and the second portion 302 is performed. Specifically, a bonding step to form the shape as illustrated in the cross-sectional view (C) of FIG. 7 is performed by bonding a surface of the first portion 301 (hereinafter referred to as a "first surface 303") illustrated in the cross-sectional view (A) of FIG. 7 and a surface of the second portion 302 (hereinafter referred to as a "second surface 304") illustrated in the cross-sectional view (B) of FIG. 7.

When the first surface 303 and the second surface 301 are bonded as illustrated in the cross-sectional view (C) of FIG. 7, an acoustic apparatus or an acoustic unit including the first cavity unit and the second cavity unit can be produced.

A main body portion (i.e., an object constituted by the first portion 301 and the second portion 302 in this example) of the acoustic apparatus is produced from a material such as, for example, acrylic resin or glass.

However, the material of the main body portion is not limited to acrylic resin or glass. First, the main body portion may be constituted by any material having a hardness equivalent to acrylic resin or glass. The material constitutes the first cavity unit, the second cavity unit, and the like. Therefore, the main body portion is preferably constituted by a material having such a property that the material does not appreciably deform in response to a sound pressure. For example, when the main body portion is constituted by a soft material, the soft material may absorb sound. Therefore, the main body portion is preferably constituted by a material that does not absorb much sound.

Furthermore, the main body portion may be constituted by any material having a transparency equivalent to acrylic resin or glass. Specifically, the main body portion is preferably constituted by a material having a property of transmitting light. The transparency is determined based on the type and the like of the display apparatus.

Second Embodiment

A display apparatus according to the second embodiment is different from the display apparatus according to the first embodiment in that the display apparatus further includes a sound source and a space that is in contact with the sound source. Hereinafter, features different from the first embodiment are mainly explained. The same elements are denoted with the same reference numerals, and description thereabout is omitted.

Figure 8:
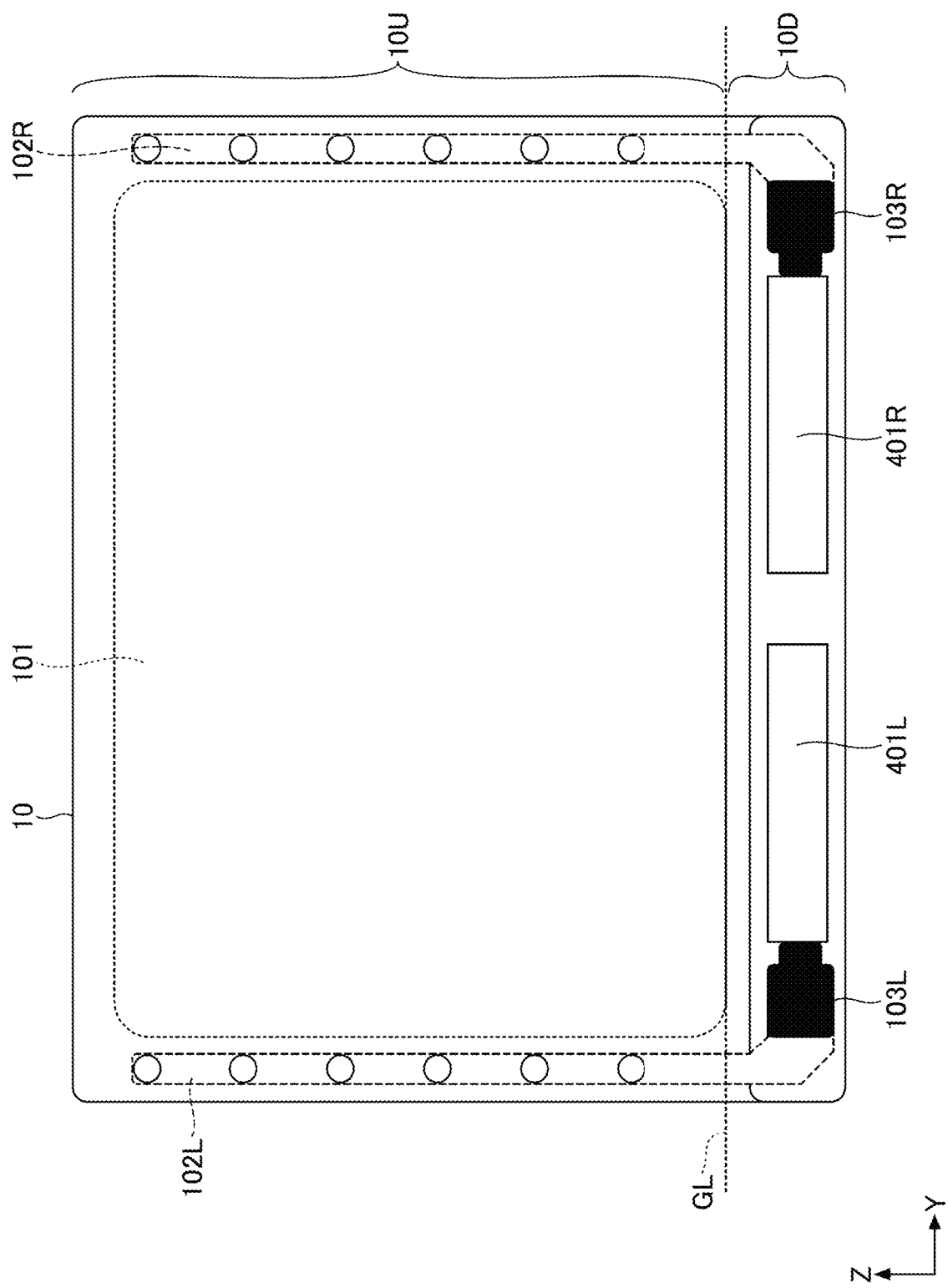
FIG. 8 is a drawing illustrating an example of configuration of a HUD according to a second embodiment.

FIG. 8 is a drawing illustrating an example of configuration of a HUD according to the second embodiment. Hereinafter, similar to the first embodiment, the HUD is explained as an example of a display apparatus.

In the second embodiment, for example, spaces (i.e., a left-side space 401L and a right-side space 401R in FIG. 8) that are in contact with the left-side speaker 103L and the right-side speaker 103R are formed in the lower portion 10D.

When such spaces are formed, the sound quality can be improved. In particular, when such spaces are provided, the spaces serve as what are termed as resonance chambers, and therefore, the sound quality of a bass sound can be improved. When the spaces are provided at a position such as a position in the lower portion 10D, the forward visibility of the driver is less likely to be blocked.

Third Embodiment

A display apparatus according to the third embodiment is different from the display apparatus according to the first embodiment in that the display apparatus further includes a light source. Hereinafter, features different from the first embodiment are mainly explained. The same elements are denoted with the same reference numerals, and description thereabout is omitted.

Figure 9:
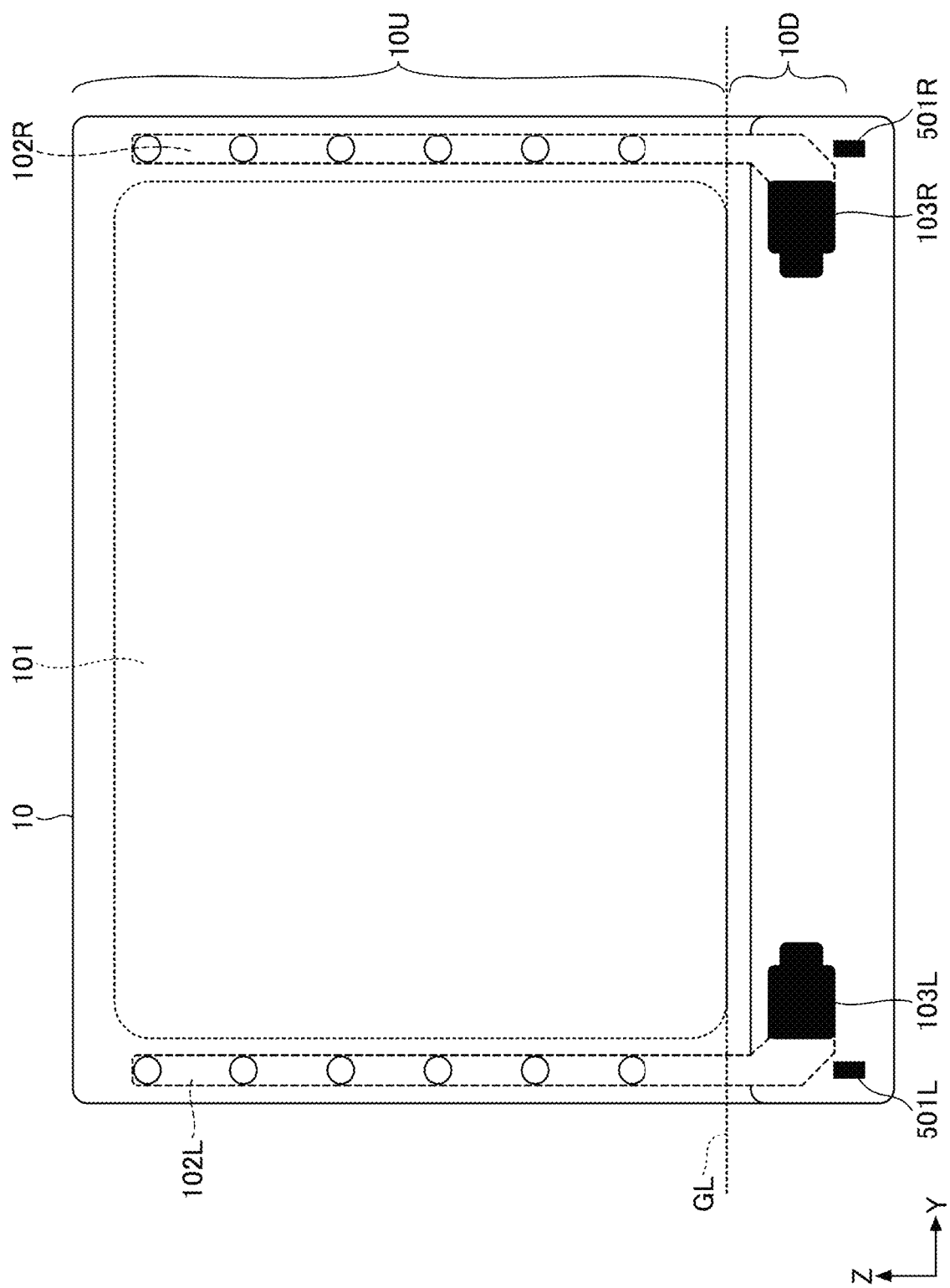
FIG. 9 is a drawing illustrating an example of configuration of a HUD according to a third embodiment.

FIG. 9 is a drawing illustrating an example of configuration of an HDD according to the third embodiment. Hereinafter, similar to the first embodiment, the HUD is explained as an example of a display apparatus.

In the third embodiment, for example, in the lower portion 10D, light sources (i.e., a left-side light source 501L and a right-side light source 501R in FIG. 9) are additionally provided below the left-side acoustic unit 102L and the right-side acoustic unit 102R. The light sources may be provided at positions other than the positions illustrated in FIG. 9, so long as the acoustic unit can be illuminated.

The left-side light source 501L and the right-side light source 501R are, for example, RGB-type light emitting diodes (LEDs). Alternatively, the light sources may be organic electro-luminescence (EL) light sources and the like.

When the left-side light source 501L and the right-side light source 501R are provided, for example, the left-side light source 501L and the right-side light source 501R can emit light as follows.

Figure 10:
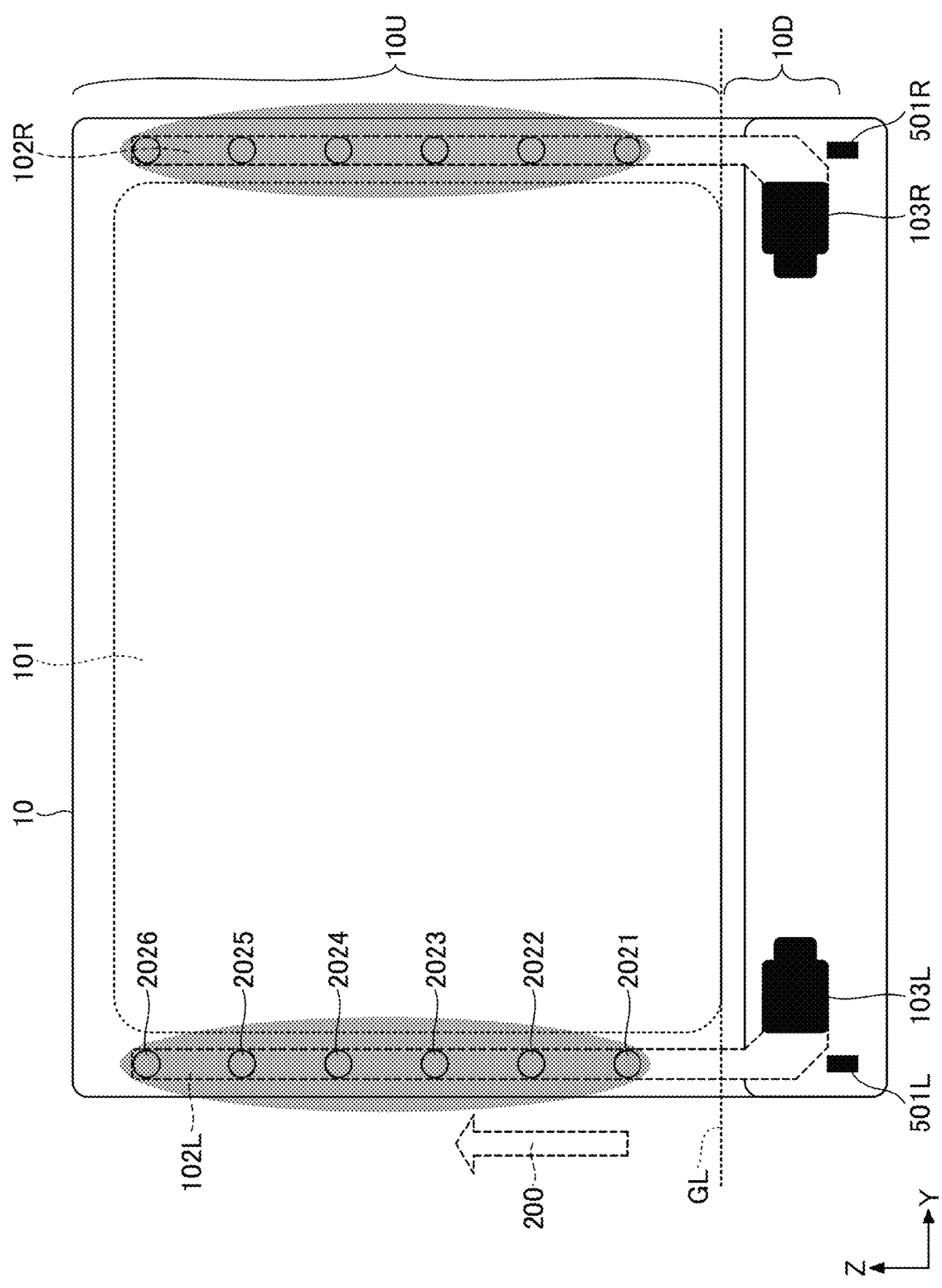
FIG. 10 is a drawing illustrating an example of illumination according to the third embodiment.

FIG. 10 is a drawing illustrating an example of illumination according to the third embodiment. For example, when the left-side light source 501L and the right-side light source 501R emit light in the sound emission direction 200 that is substantially the same direction as the direction of sound emission, the emitted light is reflected by the reflection surfaces and the like, similarly to the sound, and areas in proximity to the through holes can be illuminated.

For example, when danger is detected by a sensor or other information is acquired, it is preferable to cause the left-side light source 501L and the right-side light source 501R to emit light to notify the driver of danger. Specifically, the sensor detects, e.g., obstacles, pedestrians, approach of emergency vehicles, approach to dangerous places such as cliffs, traffic information, or combinations thereof.

In particular, the left-side light source 501L and the right-side light source 501R preferably emit light in multiple colors. For example, when, e.g., danger is detected, the left-side light source 501L and the right-side light source 501R emit red light. Conversely, when, e.g., traffic information is acquired, the left-side light source 501L and the right-side light source 501R emit green light. In this manner, the left-side light source 501L and the right-side light source 501R may emit light in colors so that the driver can understand the type of information, the degree of danger, and the like. Furthermore, light intensity may be changed, light may be blinked, and emission of light may be combined with emission of sound.

Modified Embodiment

For example, the sound source may be arranged in the following direction.

Figure 11:
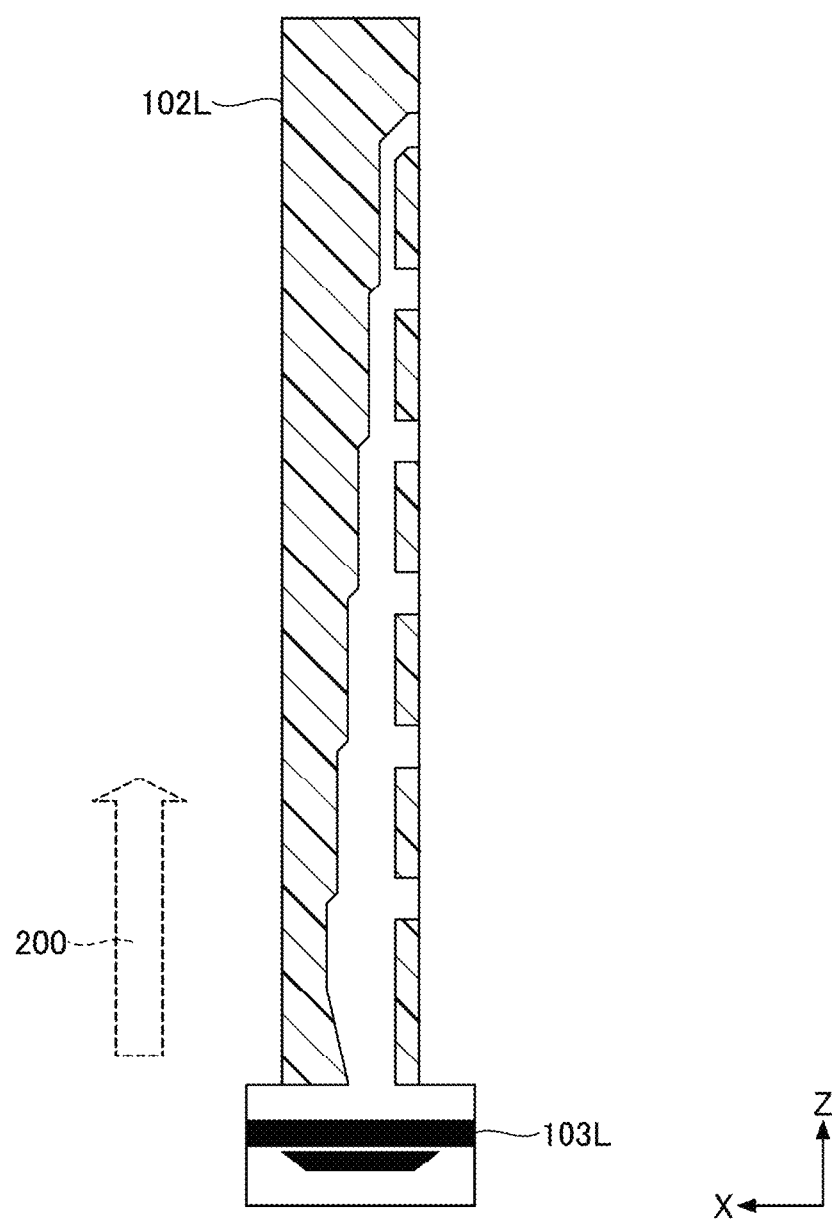
FIG. 11 is a drawing illustrating a first modified embodiment of a direction of a sound source.

FIG. 11 is a drawing illustrating a first modified embodiment of a direction of a sound source. Hereinafter, for example, the left-side acoustic unit 102L as illustrated in the cross-sectional view (A) of FIG. 3 is explained.

FIG. 11 is a cross-sectional view similar to FIG. 3. As illustrated in FIG. 11, the left-side speaker 103L may be provided in an upward direction (Z axis direction).

Figure 12:
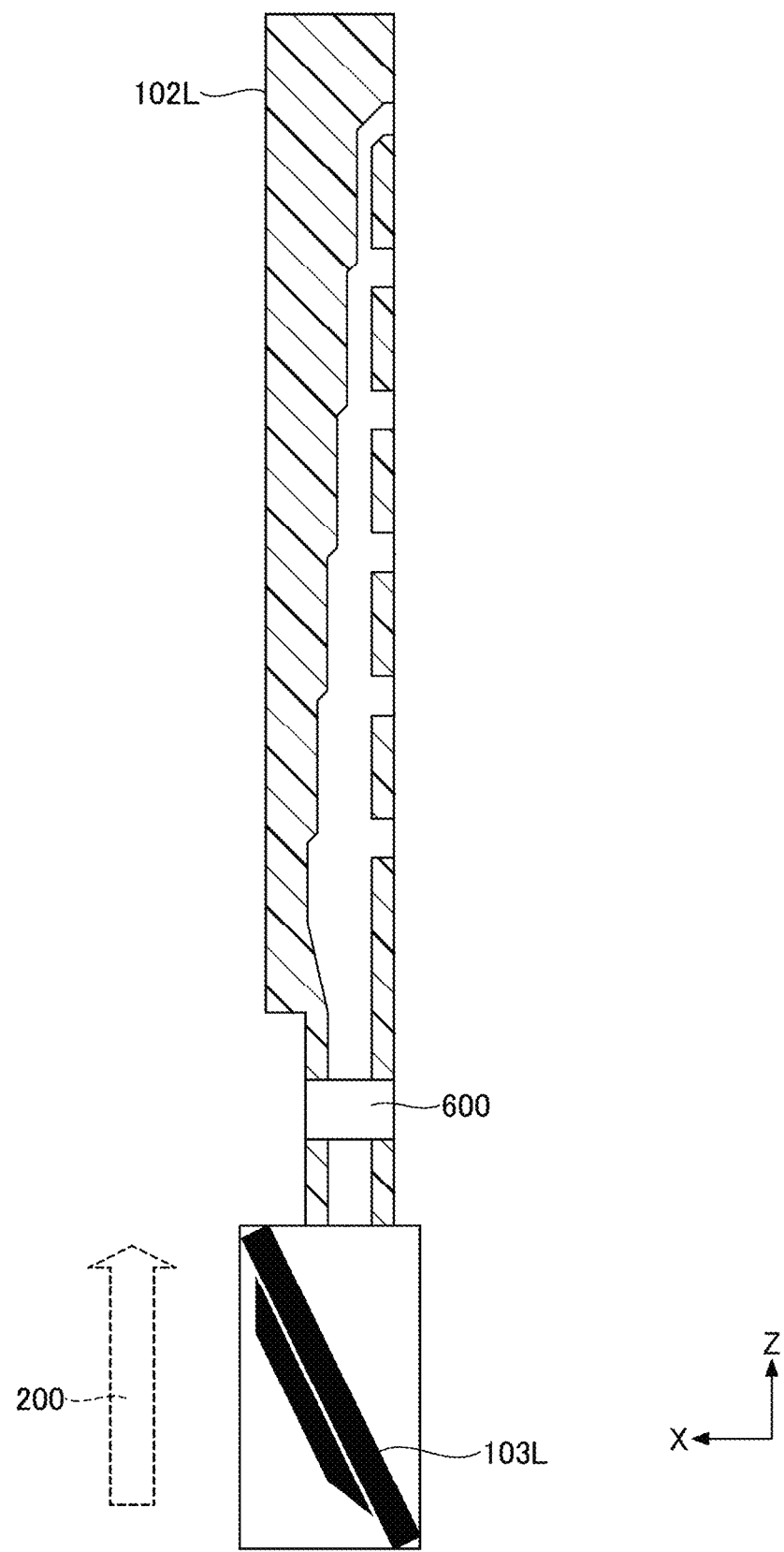
FIG. 12 is a drawing illustrating a second modified embodiment of a direction of a sound source.

FIG. 12 is a drawing illustrating a second modified embodiment of a direction of a sound source. The embodiment as illustrated in FIG. 12 is different from FIG. 11 in that the left-side speaker 103L is provided with an angle of about 30 degrees with respect to the Z axis direction. Even in such a case, much of the sound emitted by the left-side speaker 103L propagates in the Z axis direction. Therefore, the sound emission direction 200 is mainly the Z axis direction as illustrated in FIG. 12.

In this manner, the sound emission direction 200 is not determined only by the direction of the sound source, but is rather a direction that is determined by the first cavity unit or structures and the like provided in proximity to the sound source.

A tube 600 may be provided between the sound source and the acoustic unit. The tube 600 is made from, for example, metal or acrylic resin.

The display apparatus may be provided at a position other than the dashboard. For example, the display apparatus may be provided at a position explained below.

Figure 13:
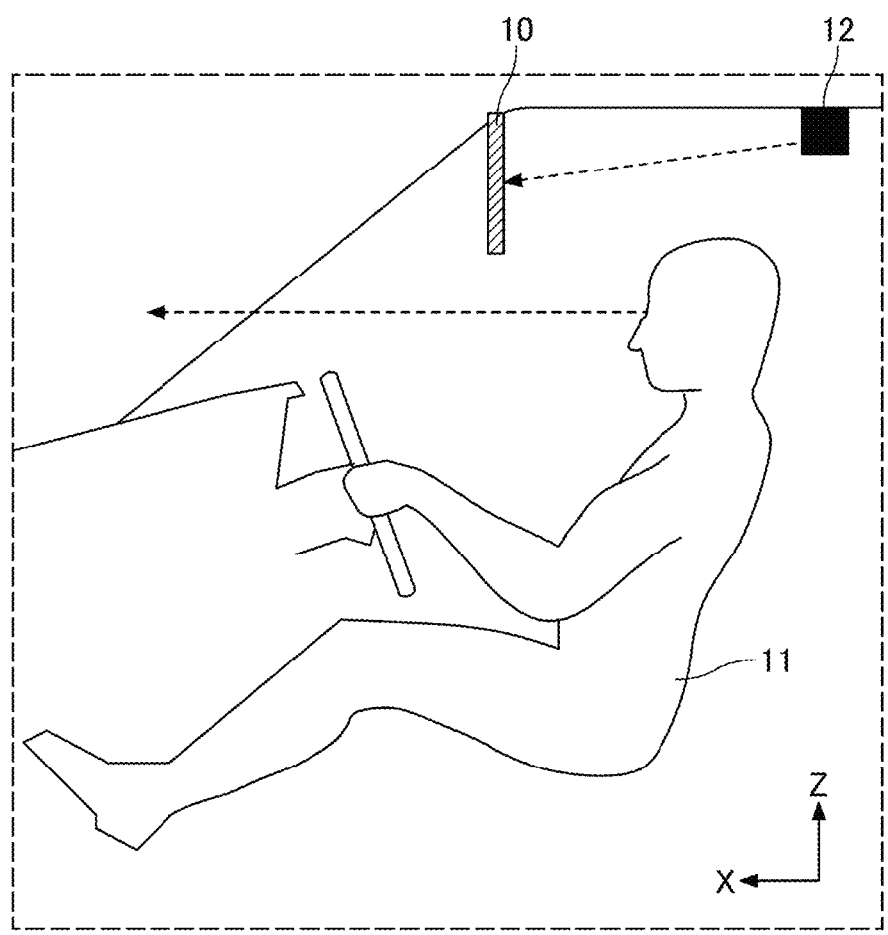
FIG. 13 is a drawing illustrating a modified embodiment of installation of a display apparatus.

FIG. 13 is a drawing illustrating a modified embodiment of installation of a display apparatus. FIG. 13 is different from the enlarged cross-sectional view (B) of FIG. 1 in that the position where the HUD 10 and the like are provided is the ceiling.

Furthermore, the display apparatus may be a windshield rearview mirror or the like.

Figure 14:
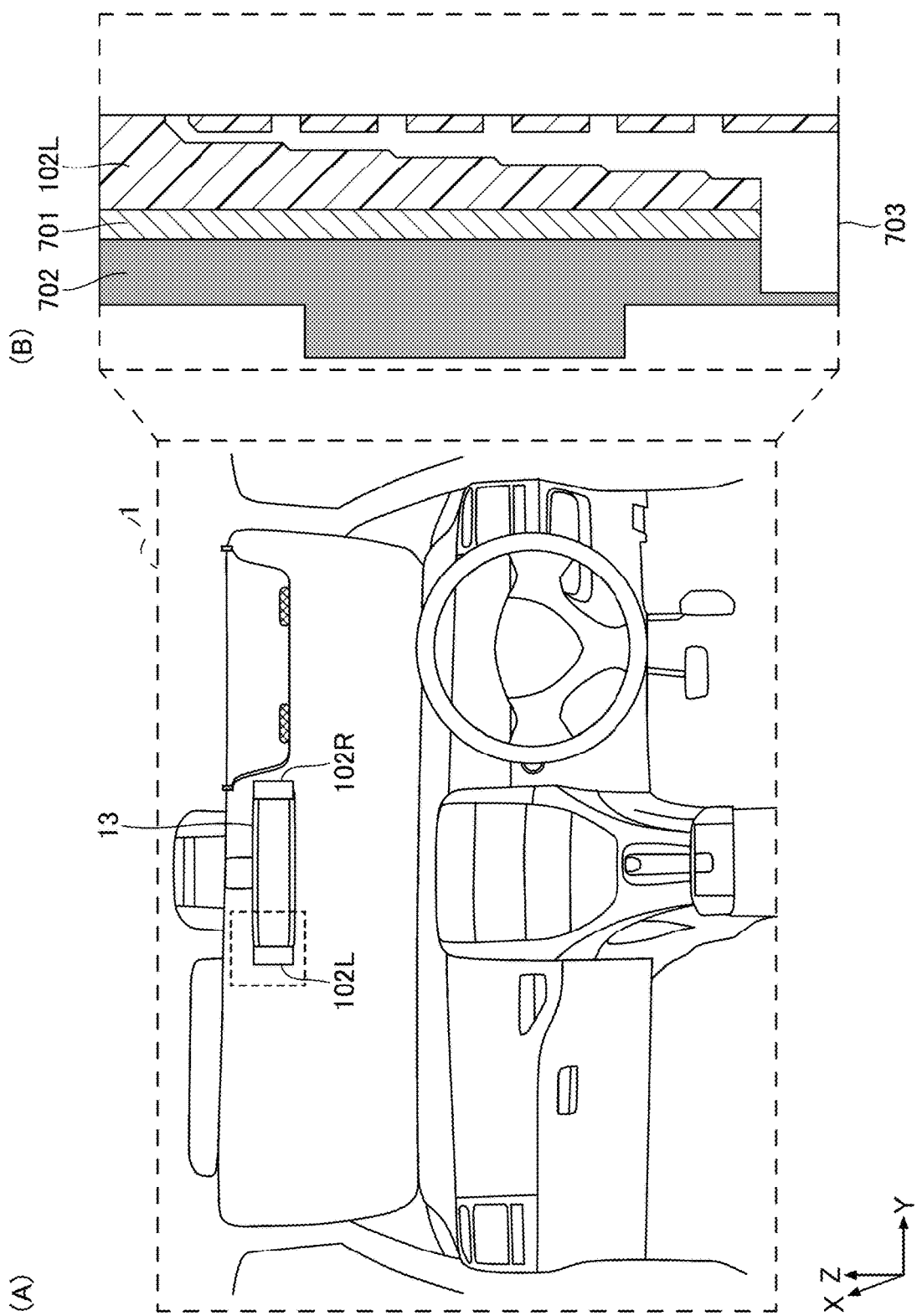
FIG. 14 is a drawing illustrating an example of application to a windshield rearview mirror.

FIG. 14 is a drawing illustrating an example of application to a windshield rearview mirror. In FIG. 14, a part (A) is a drawing illustrating an interior of the vehicle 1. In a windshield rearview mirror 13, the left-side acoustic unit 102L and the right-side acoustic unit 102R may be provided so as to avoid, for example, the central portion (i.e., a portion showing the rear view with a mirror or the like, or serving as a screen or the like) of the windshield rearview mirror 13.

In FIG. 14, a part (B) is an enlarged left side view illustrating an example of application to a windshield rearview mirror 13. Specifically, the part (B) of FIG. 14 is a cross-sectional view similar to the cross-sectional view (A) of FIG. 3. For example, as illustrated in FIG. 3, a screen 701, a mirror main body 702, and the like are located with respect to the left-side acoustic unit 102L. Furthermore, a mirror inner space 703 or the like may be provided.

Furthermore, the above-described embodiments may be carried out in combination.

The acoustic apparatus does not have to be configured integrally with the display apparatus and the like as shown in the above-described example. Specifically, the acoustic apparatus may be an apparatus provided separately from the display apparatus and the like.

The second cavity unit is not limited to the through hole in the above-described example. Specifically, the second cavity unit may be configured to be connected with the first cavity unit to be able to output sound transmitted from the first cavity unit. Therefore, the second cavity unit is not limited to the through holes, and may be holes and the like in a polygonal shape.

Also, the directions of the opening portions of the second cavity unit, specifically, the second direction, may be, for example, directions as described below.

Figure 15:
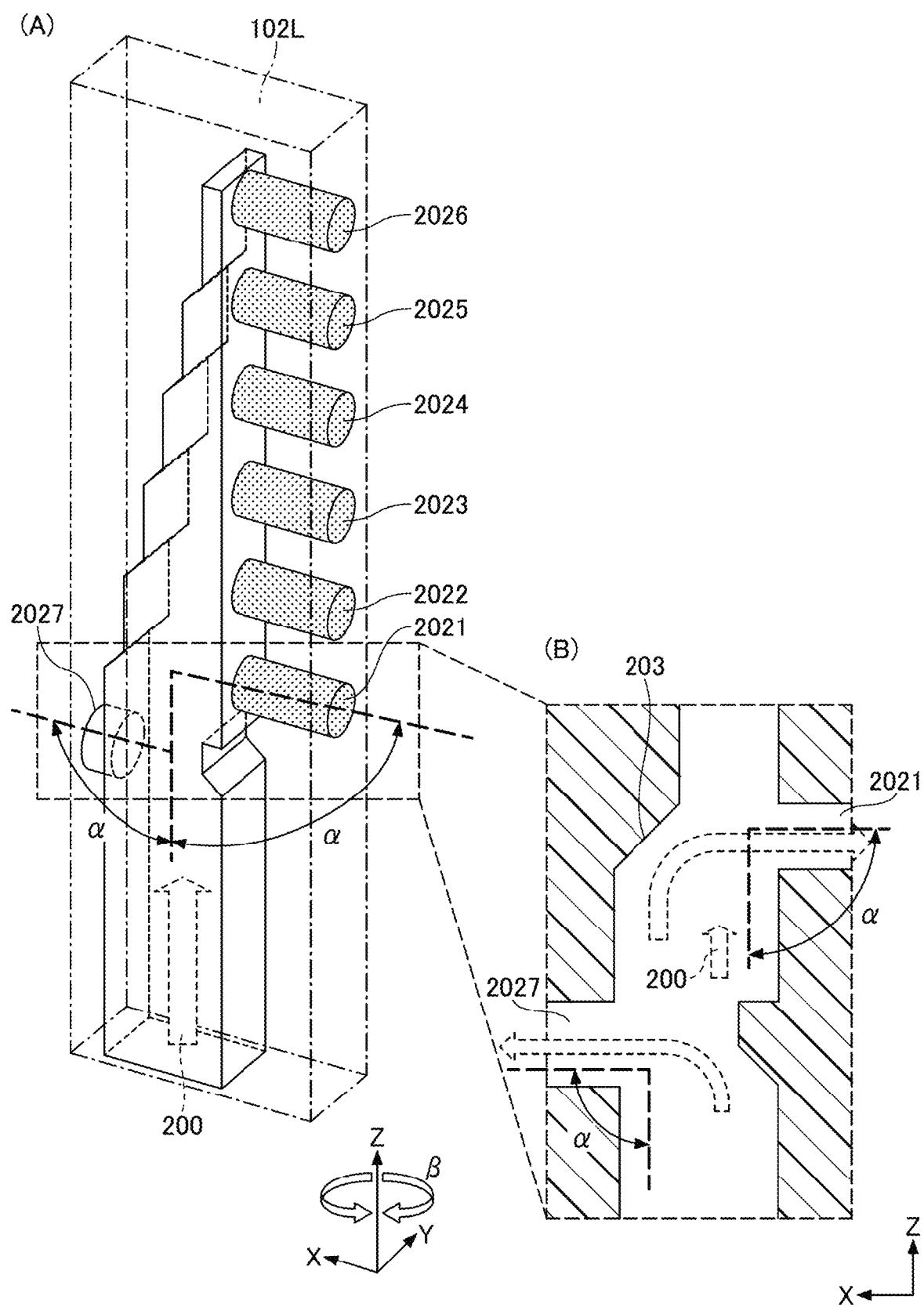
FIG. 15 is a drawing illustrating a modified embodiment of a second cavity unit.

FIG. 15 is a drawing illustrating a modified embodiment of the second cavity unit. Similarly to FIG. 5, the perspective view (A) of FIG. 15 is a perspective view illustrating an example of internal structure of the left-side speaker 103L. The perspective view (A) of FIG. 15 is different from FIG. 5 in that the left-side speaker 103L includes a seventh through hole 2027.

An enlarged cross-sectional view (B) of FIG. 15 is a cross-sectional view similar to the enlarged cross-sectional view (B) of FIG. 3.

Specifically, the seventh through hole 2027 is an example of a second cavity unit with an opening portion in the 180 degrees opposite direction from the first through hole 2021 and the like. In this manner, the second direction may include multiple directions.

The opening portions of the first through hole 2021 and the like face the right side in the enlarged cross-sectional view (B) of FIG. 15 (i.e., the direction toward the driver in the arrangement illustrated in FIG. 1), whereas the opening portion of the seventh through hole 2027 faces the left side in the enlarged cross-sectional view (B) of FIG. 15 (i.e., the front side in the arrangement illustrated in FIG. 1). In this manner, the second direction may be set to any direction. When the second direction is set to a direction in which sound is to be transmitted, sound can be transmitted efficiently. For example, when an opening portion of a through hole is formed in a direction other than the illustrated directions, sound can be transmitted in the direction of the opening portion.

As described above, the second direction is, for example, a direction orthogonal to the first direction. Specifically, as illustrated in the enlarged cross-sectional view (B) of FIG. 3, the first direction is the Z axis direction, whereas the second direction is the X axis direction.

Hereinafter, an angle formed by the first direction and the second direction (i.e., an angle around the Y-axis with reference to the first direction being "0 degrees") is referred to as a "first angle $\alpha$".

The second direction does not have to be strictly orthogonal to the first direction. Specifically, the first angle $\alpha$ is not limited to 90 degrees. For example, the second direction may be at an angle of about 80 degrees to 100 degrees (specifically, the first angle $\alpha$ is 90 degrees±10 degrees) with reference to the first direction.

However, the second direction may be at any angle so long as it is on a plane orthogonal to the first direction (i.e., an v-Y plane). Hereinafter, an angle in the X-Y plane (an angle around the Z axis) is referred to as a "second angle $\beta$".

The second angle $\beta$ may be any angle between 0 degrees to 360 degrees.

The display apparatus may be, for example, any apparatus as described below.

Figure 16:
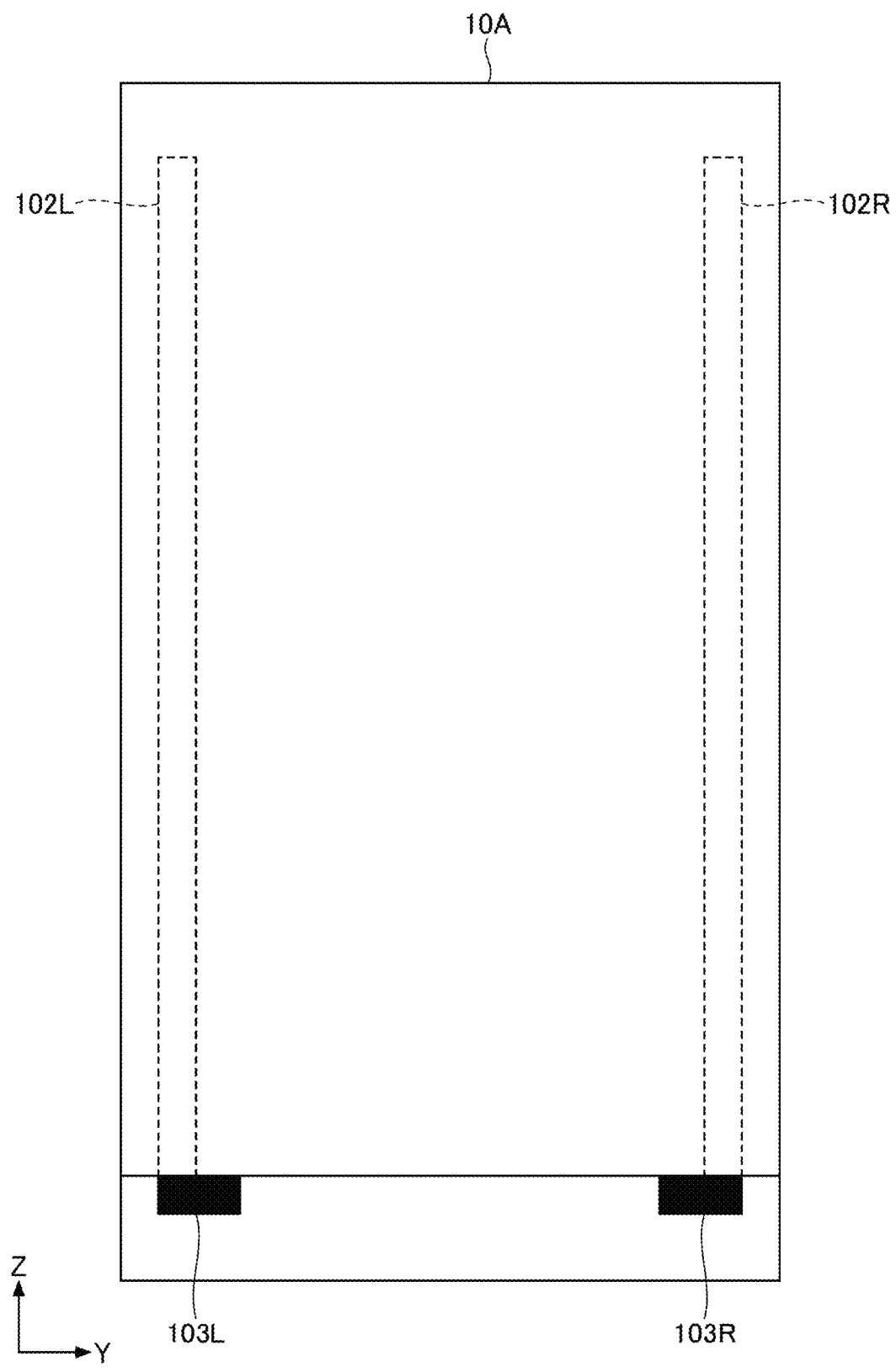
FIG. 16 is a drawing illustrating a modified embodiment of a display apparatus.

FIG. 16 is a drawing illustrating a modified embodiment of a display apparatus. For example, the display apparatus may be what is termed as a digital signage 10A or the like. In this manner, the left-side acoustic unit 102L, the right-side acoustic unit 102R, and the like may be combined with the digital signage 10A and the like.

The left-side acoustic unit 102L and the right-side acoustic unit 102R do not have to be integrated with the display unit and the like as illustrated. Specifically, the left-side acoustic unit 102L and the right-side acoustic unit 102R may be configured to be a physically separate apparatus (specifically, a separate acoustic apparatus different from the display apparatus) that can be attached to and detached from the display unit.

<Example of Acoustic Apparatus>

For example, the acoustic apparatus may be implemented as other than the HUD.

Figure 17:
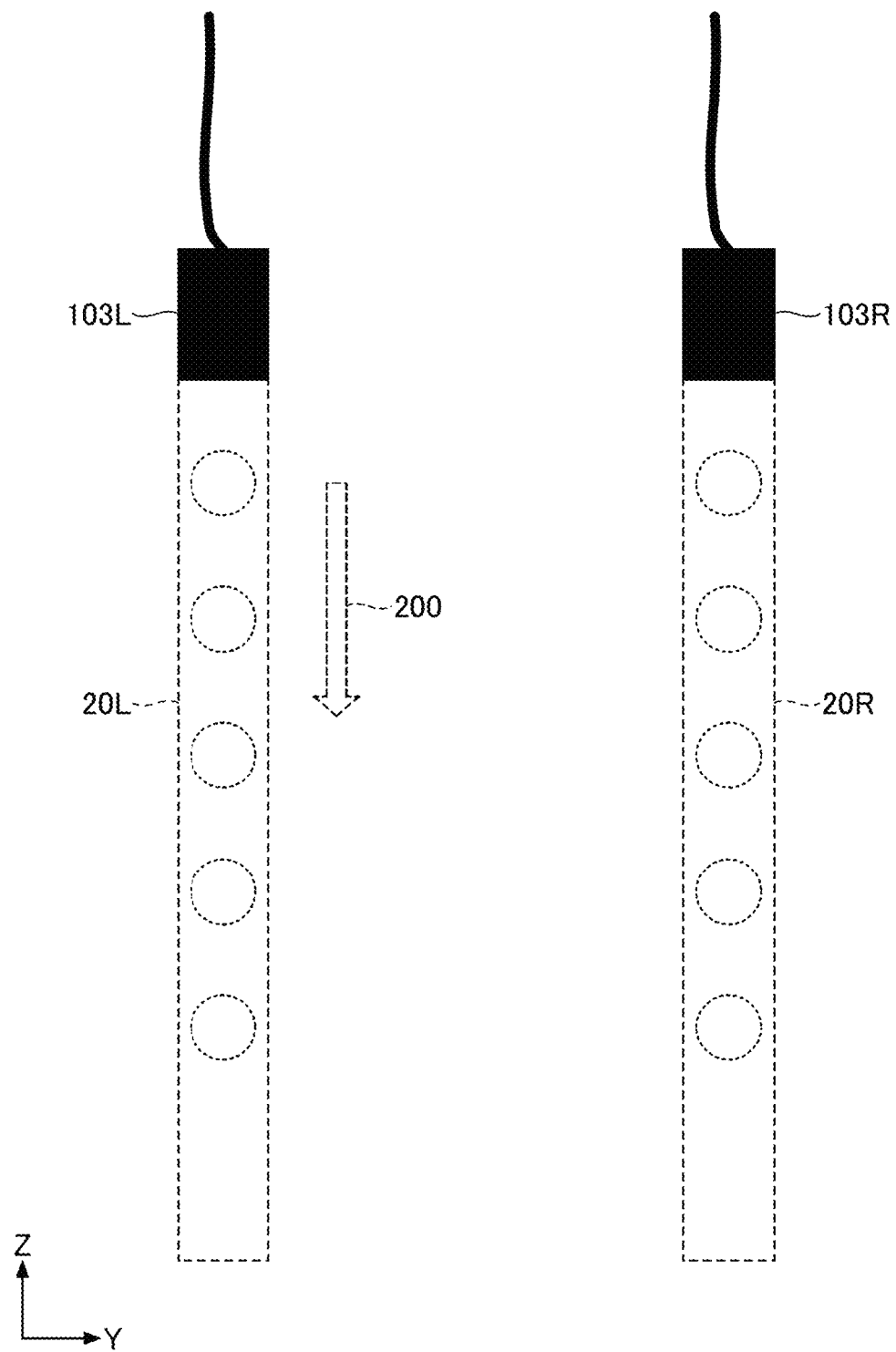
FIG. 17 is a drawing illustrating an example of installation of acoustic apparatuses.

FIG. 17 is a drawing illustrating an example of installation of acoustic apparatuses. For example, a pair of acoustic apparatuses, e.g., a left-side acoustic apparatus 20L and a right-side acoustic apparatus 20R, are installed.

Alternatively, a single acoustic apparatus may be used alone, or three or more acoustic apparatus may be used as a set.

In the example illustrated in FIG. 17, the acoustic apparatuses are installed as being hung from the ceiling and the like. The acoustic apparatuses may be installed in such an orientation.

When the acoustic apparatuses are installed in this manner, the presence of the acoustic apparatuses is less likely to be noticed, and therefore, it is not necessary to hide the acoustic apparatuses so that they may not be noticed by the user in a planetarium, an aquarium, a museum, an exhibition hall, an event venue, or the like. When the acoustic apparatuses are in a color close to a transparent color, the acoustic apparatuses are inconspicuous even if the acoustic apparatuses are placed in various positions, and therefore, presentation can be performed by emitting sounds from various positions.

<Summary>

According to the above configuration, an acoustic apparatus and a display apparatus that alleviate blocking of forward visibility can be provided. An acoustic apparatus or a display apparatus capable of transmitting light can be provided. Such an acoustic apparatus that transmits light allows the user such as a driver to be less likely to notice the presence of the apparatus as compared with a black speaker or the like. Furthermore, when there is an acoustic unit or an acoustic apparatus as described above, the same sound as the sound output from speakers can be output. Therefore, with the HUD and the like, three-dimensional sound and the like can be achieved with the apparatus that transmits light so as not to block the field of view of the driver.

Therefore, the display apparatus does not block the field of view of the driver, or the size of the display surface of the display apparatus, on which an image and the like is projected, is less likely to decrease.

When, for example, the acoustic unit, the display unit, and the like are integrally configured with a single material in the display apparatus such as the HUD, synergetic effects of images and sounds can be achieved.

The present invention is not limited to the configuration and the like described above. Specifically, additions and changes can be made with respect to embodiments without departing from the subject matter described in the claims, and the embodiments can be appropriately implemented according to the application forms thereof.

Although the present invention has been described above with reference to the embodiments, the present invention is not limited to the features described in the embodiments. These features can be changed without departing from the scope of the claimed subject matter, and can be appropriately determined according to the implementation to which the present invention is applied.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A display apparatus comprising:
    a display; and
    an acoustic unit connected to a sound source to transmit sound,
    wherein the acoustic unit includes:
        a first cavity extending from the sound source in a first direction in which the sound is emitted; and
        a plurality of second cavities extending in a second direction that is different from the first direction,
    the plurality of second cavities are connected with the first cavity at mutually different positions, and
    a width of the first cavity in the second direction gradually and discontinuously decreases as a position shifts from one of the plurality of second cavities nearest to the sound source to another of the plurality of second cavities farthest from the sound source.

2. The display apparatus according to claim 1, wherein the display apparatus is a head-up display.

3. The display apparatus according to claim 1, wherein a reflection surface configured to reflect the sound is formed in the first cavity.

4. The display apparatus according to claim 3, wherein the reflection surface reflects the sound from the first direction such that the reflected sound is transmitted in the second direction.

5. The display apparatus according to claim 1, wherein a total volume of the plurality of second cavities is equal to or more than an air volume moved by the sound source.

6. The display apparatus according to claim 1, further comprising a space is in contact with the sound source.

7. The display apparatus according to claim 1, further comprising a light source emitting light in the first direction.

8. The display apparatus according to claim 1, wherein the acoustic unit is in a transparent color.

9. An acoustic apparatus connected to a sound source and configured to transmit sound, the acoustic apparatus comprising:
    a first cavity extending from the sound source in a first direction in which the sound is emitted; and
    a plurality of second cavities extending in a second direction that is different from the first direction,
    wherein:
    the plurality of second cavities are connected with the first cavity at mutually different positions, and
    a width of the first cavity in the second direction gradually and discontinuously decreasing as a position shifts from one of the plurality of second cavities nearest to the sound source to another of the plurality of second cavities farthest from the sound source.

10. The display apparatus according to claim 1, wherein the first cavity comprises a plurality of reflection surfaces configured to reflect the sound toward the plurality of second cavities, respectively.

* * * * *